United States Patent
Sato et al.

[11] Patent Number: 5,884,109
[45] Date of Patent: Mar. 16, 1999

[54] ELECTRO-DEVELOPING TYPE CAMERA USING ELECTRO-DEVELOPING RECORDING MEDIUM

[75] Inventors: Koichi Sato; Masato Okabe; Hironori Kamiyama; Osamu Shimizu; Yuudai Yamashita, all of Tokyo, Japan

[73] Assignees: Asahi Kogaku Kogyo Kabushiki Kaisha; Dai Nippon Printing Co., Ltd., both of Tokyo, Japan

[21] Appl. No.: 728,983

[22] Filed: Oct. 11, 1996

[30] Foreign Application Priority Data

Oct. 11, 1995 [JP] Japan .................................. 7-289319
May 1, 1996 [JP] Japan .................................. 8-134244

[51] Int. Cl.$^6$ .................................................. G03B 19/00
[52] U.S. Cl. ............................................................ 396/429
[58] Field of Search .............................. 396/30, 429, 273, 396/270, 284, 285, 389, 390, 392; 348/231, 233

[56] References Cited

U.S. PATENT DOCUMENTS

| | | | |
|---|---|---|---|
| 4,878,075 | 10/1989 | Cannon | 354/173.1 |
| 4,887,161 | 12/1989 | Watanabe et al. | 358/224 |
| 5,315,410 | 5/1994 | Takanshi et al. | 358/471 |
| 5,408,341 | 4/1995 | Takanashi et al. . | |
| 5,424,156 | 6/1995 | Aoki et al. . | |
| 5,477,289 | 12/1995 | Smart | 354/106 |
| 5,555,205 | 9/1996 | Okabe | 365/108 |
| 5,649,252 | 7/1997 | Takahashi et al. | 396/389 |
| 5,671,455 | 9/1997 | Nagata et al. | 396/390 |

FOREIGN PATENT DOCUMENTS

| | | |
|---|---|---|
| 0327236 | 8/1989 | European Pat. Off. . |
| 0622954 | 11/1994 | European Pat. Off. . |
| 2-29081 | 1/1990 | Japan . |
| 3-15087 | 1/1991 | Japan . |
| 3-278342 | 12/1991 | Japan . |
| 5-2280 | 1/1993 | Japan . |
| 5-24706 | 4/1993 | Japan . |
| 5-150251 | 6/1993 | Japan . |
| 5-165005 | 6/1993 | Japan . |
| 6-130347 | 5/1994 | Japan . |
| 6-313894 | 11/1994 | Japan . |
| 7-13132 | 1/1995 | Japan . |

*Primary Examiner*—David M. Gray
*Assistant Examiner*—John Chizmar
*Attorney, Agent, or Firm*—Greenblum & Bernstein, P.L.C.

[57] ABSTRACT

An electro-developing type camera uses an electro-developing recording medium including an electrostatic information recording medium and an electric charge keeping medium. The camera has a transparency sensor for detecting dark-zone-transparency data at a portion of the electric charge keeping medium corresponding to a dark zone defined on a light receiving surface of the electrostatic information recording medium. It is determined whether or not the dark-zone-transparency data is substantially equal to reference-transparency data. If the dark-zone-transparency data is not substantially equal to the reference-transparency data, it is warned that the electro-developing recording medium has been recorded on.

22 Claims, 11 Drawing Sheets and U.S. Pat. No. 5,424,156 disclose one
ELECTRO-DEVELOPING TYPE CAMERA USING ELECTRO-DEVELOPING RECORDING MEDIUM

BACKGROUND OF THE INVENTION

1. Field of the Invention

The present invention relates to an electro-developing type video camera using an electro-developing recording medium in which an optical image obtained through a photographing lens system is electronically and directly recorded and developed as a visible image in very little time.

2. Description of the Related Art

Such an electro-developing recording medium per se is known. For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both mediums being combined to face each other with a small gap therebetween.

An electronic still video camera using the electro-developing recording medium has already been proposed, and is referred to as an electro-developing type camera hereinafter.

In a photographing operation of the electro-developing type camera, a voltage is applied to the electro-developing recording medium, and an optical image is formed on a light receiving surface of the electrostatic information recording medium by a photographing optical system. An electric charge is distributed over the electrostatic information recording medium in accordance with a light intensity distribution of the optical image formed on the light receiving surface thereof, so that the intensity of an electric field, acting on the liquid crystal of the electric charge keeping medium, is in accordance with the electric charge distribution. Thus, the optical image is reproduced in the electric charge keeping medium as a visible image. Namely, as soon as the optical image is formed on the electrostatic information recording medium, the optical image is recorded and developed in the electric charge keeping medium.

Japanese Unexamined Patent Publication No. 5-165005 discloses another type of electro-developing recording medium. In this type medium, a structure of the electrostatic information recording medium is substantially the same as that of the electrostatic information recording medium as disclosed in the above-mentioned citations except that the inorganic oxide material layer is omitted therefrom, and that the electric charge keeping medium or liquid crystal display is constituted as a liquid-crystal-polymer composite (LCPC) using a memory type of liquid crystal such as smectic liquid crystal. Similar to the first-mentioned type of electro-developing recording medium, both the electrostatic information recording medium and the electric charge keeping medium are combined to face each other with a small gap therebetween.

Furthermore, Japanese Unexamined Patent Publications No. 6-130347 and No. 7-13132 disclose yet another type of electro-developing recording medium. In this type of medium, the inorganic oxide material layer is also omitted from the electrostatic information recording medium, and the electric charge keeping medium or liquid crystal display is also constituted as the liquid-crystal-polymer composite (LCPC) using the memory type of liquid crystal. Nevertheless, both the electricstatic information recording medium and the electric charge keeping medium are integrally combined with each other through the intermediary of a transparent insulating layer without any gap therebetween.

All things considered, when the electric charge keeping medium is constituted as a memory-type liquid crystal display using, for example, a smectic liquid crystal, the developed visible image can be kept therein even if the electric field is eliminated from the electro-developing recording medium. Thus, the electro-developing recording medium carrying the developed visible image can be preserved in the same way as slides or transparency sheet films. Also, in the memory type liquid crystal display, the developed image can be erased by heating the display to a given temperature. In this case, the same electro-developing recording medium can be repeatedly used for photographing.

Under these circumstances, the electro-developing recording medium carrying the developed visible image may be mistaken for a blank recording medium, and erroneously loaded into a camera. If the loaded medium is subjected to a second exposure, the first developed visible image is lost from the medium, and the newly-photographed image cannot be properly recorded and developed thereon.

Further, a developed recording medium is not usually unloaded from the camera immediately after photographing. Thus, the developed recording medium is frequently subjected to a double exposure, resulting in the problem mentioned above.

SUMMARY OF THE INVENTION

Therefore, an object of the present invention is to provide an electro-developing type camera using an electro-developing recording medium, which is constituted such that a warning of a double exposure can be given, when the electro-developing recording medium is determined to be a developed recording medium upon being loaded into the camera.

In accordance with a first aspect of the present invention, there is provided an electro-developing type camera using an electro-developing recording medium including an electrostatic information recording medium and an electric charge keeping medium, comprising: a transparency sensor device for detecting dark-zone-transparency data at a portion of the electric charge keeping medium corresponding to a dark zone defined on a light receiving surface of the electrostatic information recording medium; a determiner for determining whether or not the dark-zone-transparency data is substantially equal to reference-transparency data; and an announcement device for announcing a determination result obtained by the determiner.

In the electro-developing type camera according to the first aspect of the present invention, preferably, the determiner comprises a calculation device for calculating comparison data between the dark-zone-transparency data and the reference-transparency data, and the determiner determines whether or not the comparison data falls within a given permissible range.

In the electro-developing type camera according to the first aspect of the present invention, the announcement device may comprise a warning device warning that the electro-developing recording medium has been recorded on when the dark-zone-transparency data is not substantially equal to the reference transparency data. The warning device may comprise a visible warning-display panel for displaying a warning message indicating that the electro-developing recording medium has been recorded on. Also, the warning device may comprise an acoustic warning device for producing a warning sound indicating that the electro-developing recording medium has been recorded on when the dark-zone-transparency data is not substantially equal to the reference-transparency data.

In accordance with a second aspect of the present invention, there is provided an electro-developing type camera using an electro-developing recording medium including an electrostatic information recording medium and an electric charge keeping medium, comprising: a system control circuit including a memory for storing a program controlling an operation of the camera; a transparency sensor for detecting dark-zone-transparency data at a portion of the electric charge keeping medium corresponding to a dark zone defined on a light receiving surface of the electrostatic information recording medium; the program including a sub-program for determining whether or not the dark-zone-transparency data is substantially equal to reference-transparency data; and an announcement device for announcing a determination result obtained by the determiner.

In the electro-developing type camera according to the second aspect of the present invention, preferably, the sub-program comprises a calculation program for calculating comparison data between the dark-zone-transparency data and the reference-transparency data, and the sub-program determines whether or not the comparison data falls within a given permissible range.

In the electro-developing type camera according to the second aspect of the present invention, the announcement device may comprise a warning device warning that the electro-developing recording medium has been recorded on when the dark-zone-transparency data is not substantially equal to the reference transparency data. The warning device may comprise a visible warning-display panel for displaying a warning message indicating that the electro-developing recording medium has been recorded on when the dark-zone-transparency data is not substantially equal to the reference-transparency data. Also, the warning device may comprise an acoustic warning device for producing a warning sound indicating that the electro-developing recording medium has been recorded on when the dark-zone-transparency data is not substantially equal to the reference-transparency data.

In accordance with a third aspect of the present invention, there is provided an electro-developing type camera using an electro-developing recording medium including an electrostatic information recording medium and an electric charge keeping medium, comprising: a first transparency sensor device for detecting dark-zone-transparency data at a portion of the electric charge keeping medium corresponding to a dark zone defined on a light receiving surface of the electrostatic information recording medium; a second transparency sensor device for detecting reference-transparency data at a non-electric field portion of the electric charge keeping medium; a determiner for determining whether or not the dark-zone-transparency data is substantially equal to reference-transparency data; and an announcement device for announcing a determination result obtained by the determiner.

In the electro-developing type camera according to the third aspect of the present invention, preferably, the determiner comprises a calculation device for calculating comparison data between the dark-zone-transparency data and the reference-transparency data, and the determiner determines whether or not the comparison data falls within a given permissible range.

In the electro-developing type camera according to the third aspect of the present invention, the announcement device may comprise a warning device warning that the electro-developing recording medium has been recorded on when the dark-zone-transparency data is not substantially equal to the reference transparency data. The warning device may comprise a visible warning-display panel for displaying a warning message indicating that the electro-developing recording medium has been recorded on when the dark-zone-transparency data is not substantially equal to the reference-transparency data. Also, the warning device may comprise an acoustic warning device for producing a warning sound indicating that the electro-developing recording medium has been recorded on when the dark-zone-transparency data is not substantially equal to the reference-transparency data.

In accordance with a fourth aspect of the present invention, there is provided an electro-developing type camera using an electro-developing recording medium including an electrostatic information recording medium and an electric charge keeping medium, comprising: a system control circuit including a memory for storing a program controlling an operation of the camera; a first transparency sensor for detecting dark-zone-transparency data at a portion of the electric charge keeping medium corresponding to a dark zone defined on a light receiving surface of the electrostatic information recording medium; a second transparency sensor device for detecting reference-transparency data at a non-electric field portion of the electric charge keeping medium; the program including a sub-program for determining whether or not the dark-zone-transparency data is substantially equal to the reference-transparency data; and an announcement device for announcing a determination result obtained by the determiner.

In the electro-developing type camera according to the fourth aspect of the present invention, preferably, the sub-program may comprise a calculation program for calculating comparison data between the dark-zone-transparency data and the reference-transparency data, and the sub-program determines whether or not the comparison data falls within a given permissible range.

In the electro-developing type camera according to the fourth aspect of the present invention, the announcement device may comprise a warning device warning that the electro-developing recording medium has been recorded on when the dark-zone-transparency data is not substantially equal to the reference transparency data. The warning device may comprise a visible warning-display panel for displaying a warning message indicating that the electro-developing recording medium has been recorded on when the dark-zone-transparency data is not substantially equal to the reference-transparency data. Also, the warning device may comprise an acoustic warning device for producing a warning sound indicating that the electro-developing recording medium has been recorded on when the dark-zone-transparency data is not substantially equal to the reference-transparency data.

BRIEF DESCRIPTION OF THE DRAWINGS

These objects and other objects of the present invention will be better understood from the following description, with reference to the accompanying drawings in which:

FIG. 8 is a flowchart showing a routine for determining whether an electro-developing recording medium loaded in the first embodiment of the electro-developing type camera has been recorded on;

FIG. 13 is a flowchart showing a routine for determining whether an electro-developing recording medium loaded in the second embodiment of the electro-developing type camera has been recorded on;

DESCRIPTION OF THE PREFERRED EMBODIMENTS

Figure 1:
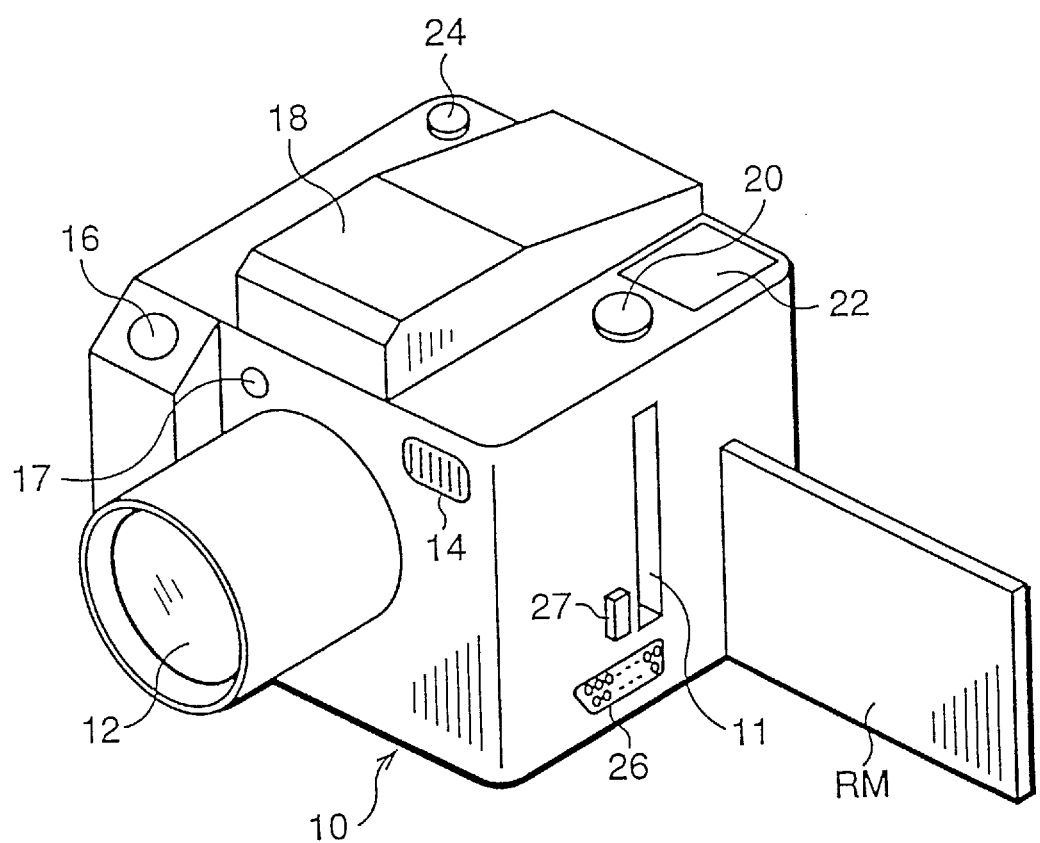
FIG. 1 is a schematic perspective view showing an appearance of a first embodiment of an electro-developing type camera using an electro-developing recording medium according to the present invention.

FIG. 1 is an external view of an electro-developing type camera constituted as an electronic still video camera in accordance with the present invention. The camera comprises a camera body 10 having an elongated slot 11 formed in a side wall thereon. An electro-developing recording medium RM is loaded and unloaded in the camera through the elongated slot 11.

When viewing the camera body 10 from a front side thereof, a photographing optical system 12 is provided at an approximately central location on front surface of the camera body 10, and an electronic flash 14 is disposed on the front surface of the camera body 10 above and to the right side of and above the photographing optical system 12. A release switch 16 and a photometry sensor 17 are provided on the front, on the opposite side of the photographing optical system 12 relative to the electronic flash 14. A view finder 18 is provided centrally on the top surface of the camera body 10. A scan start switch 20 and an LCD (liquid crystal display) panel 22 are provided on the top surface, to one side of the view finder 18, and a main switch 24 is provided on the other side of the view finder 18. Further, an output terminal connector 26 is provided in the side wall of the camera in which the elongated slot 11 is formed, so that an image signal obtained by the camera can be outputted to an external recording device. Note, in FIG. 1, reference numeral 27 indicates a button for ejecting and unloading the electro-developing recording medium from the camera through the elongated slot 11.

Figure 2:
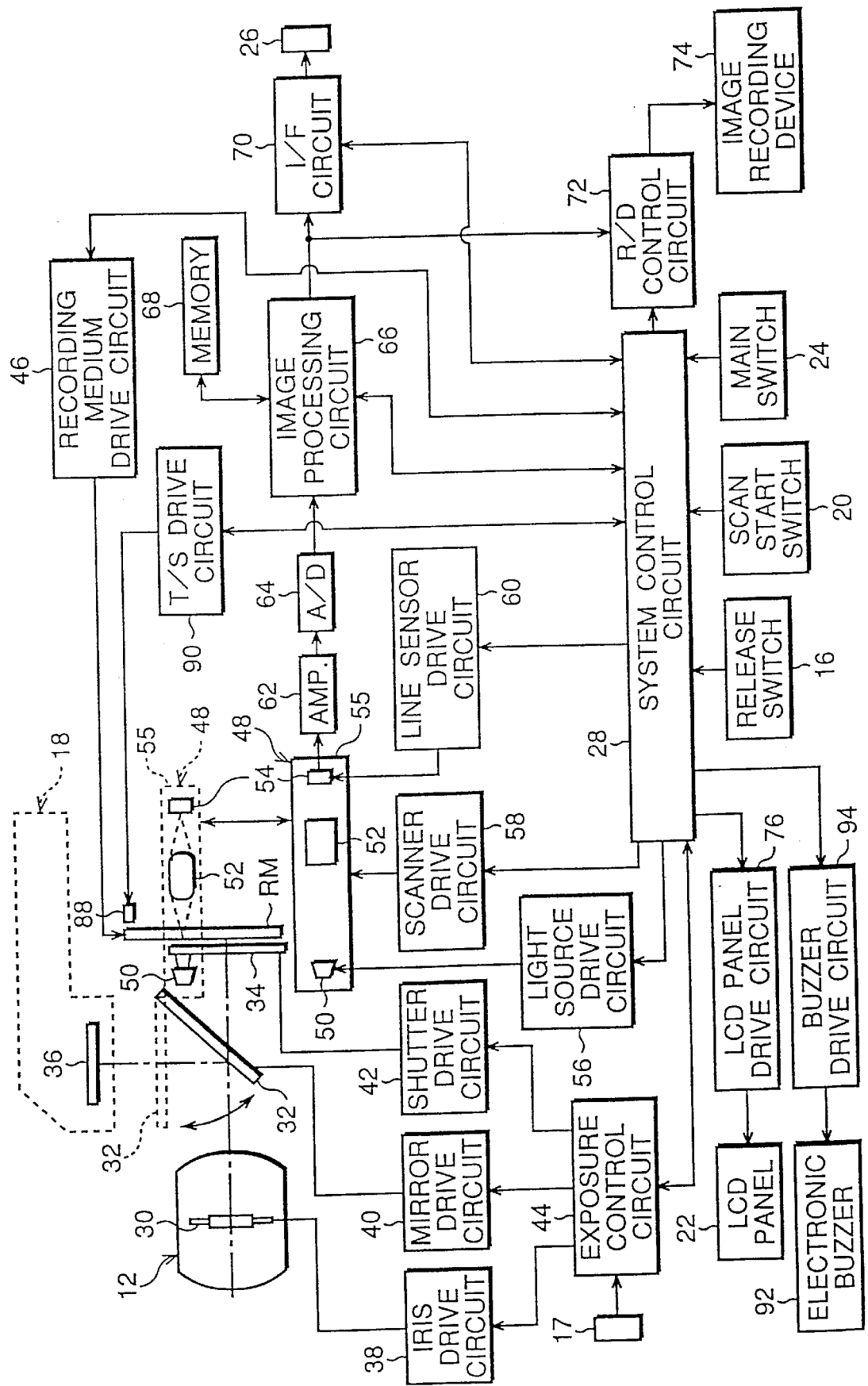
FIG. 2 is a block diagram of the first embodiment of the electro-developing type camera according to the present invention.

FIG. 2 shows a block diagram of a first embodiment of the electro-developing type camera according to the present invention. A system control circuit 28, which includes a microcomputer or microprocessor, a read-only memory (ROM), and a random-access-memory (RAM), etc., is provided to control the electro-developing type camera as a whole.

The photographing optical system 12 has a plurality of lens groups and an aperture or diaphragm 30 incorporated therein, and the electro-developing recording medium RM loaded through the elongated slot 11 is disposed behind the photographing optical system 12. A quick return mirror 32 is placed between the photographing optical system 12 and the electro-developing recording medium RM, and a shutter 34 is provided between the quick return mirror 32 and the electro-developing recording medium RM. A focusing glass 36 included in a view finder optical system of the view finder 18 is disposed above the quick return mirror 32.

The diaphragm 30, the mirror 32 and the shutter 34 are driven by an iris drive circuit 38, a mirror drive circuit 40, and a shutter drive circuit 42, respectively, and these drive circuits 38, 40, and 42 are controlled by an exposure control circuit 44 which is operated in accordance with a command signal outputted by the system control circuit 28.

While an exposure is controlled, the size of the diaphragm 30 is adjusted by the iris drive circuit 38 under control of the exposure control circuit 44 based on an output signal of the photometry sensor 17.

The quick return mirror 32 is usually in a down-position (the inclined position shown by the solid lines in FIG. 2), and thus, light beams passing through the photographing optical system 12 are directed to the optical system of the viewfinder 18, so that an object to be photographed can be observed through the viewfinder 18 by a photographer. When a photographing operation is executed, the quick return mirror 32 is rotated upward by the mirror drive circuit 40, and is then in an up-position (the horizontal position shown by the broken lines in FIG. 2), so that the light beams are directed to the shutter 34.

The shutter 34 is usually closed, however, when taking a photograph, the shutter 34 is opened over a given period of time by the shutter drive circuit 42 under control of the exposure control circuit 44. Thus, during the photographing operation, the light beams, passing through the photographing optical system 12 and the shutter 34, is directed to a light receiving surface of the electro-developing recording medium RM. Namely, by rotating the quick return mirror 42 from the down position to the up-position, and by opening the shutter 34, an optical image to be photographed by the photographing optical system 12 is focussed on the light receiving surface of the electro-developing recording medium RM.

A voltage is applied to the electro-developing recording medium RM under control of a recording medium drive circuit 46 which is operated in accordance with a command signal outputted by the system control circuit 28. By exposing the electro-developing recording medium RM while applying the voltage, the optical image obtained by the photographing optical system 12 is developed in the electro-developing recording medium RM as a visible image.

An image reader or scanning mechanism 48 is provided in the camera body 10 in the vicinity of the electro-developing recording medium RM loaded therein, and executes a scanning operation for electronically reading the developed image of the electro-developing recording medium RM. The scanning mechanism 48 comprises a linear light source 50, a scanner optical system 52, and a line image sensor 54 which are supported by a carriage member 55, all of which are aligned with each other.

The linear light source 50 is positioned at the front side of the shutter 34 and the electro-developing recording medium RM, and includes an LED (light emitting diode) array having a plurality of light emitting diodes aligned with each other, and a collimating lens for converting the light rays emitted therefrom, into parallel light rays. These elements are arranged so as to form a linear light emitting surface. The scanner optical system 52 and the line sensor 44 are positioned behind the electro-developing recording medium RM. The line sensor 44 is constructed as a one-dimensional CCD sensor having, for example 2,000 pixel elements which form a linear light receiving surface. The parallel light rays emitted from the linear light source 50 are focussed on the linear light receiving surface of the line sensor 44 by the scanner optical system 52.

The carriage member 55, by which the linear light source 50, the scanner optical system 52, and the line sensor 54 are supported, is moveable between a lower position shown by a solid line in FIG. 2 and an upper position shown by a broken line in FIG. 2, and a movement of the carriage member 55 is carried out by a drive motor (not shown) such as a stepping motor, a servo motor, or the like.

When the scanning operation or reading operation of the developed image from the electro-developing recording medium RM is executed, the shutter 34 is opened, and the linear light source 50 is turned ON. Then, the carriage member 55, which supports the scanning mechanism 48, is moved from the lower position (solid lines) to a scanning start position, and is further moved intermittently from the scanning start position toward the upper position (broken lines). Thus, the electro-developing recording medium RM is scanned with the light rays emitted from the light source 50 during the intermittent movement of the scanning mechanism 48.

During the scanning operation, the light rays passing through the electro-developing recording medium RM, i.e., the light rays carrying image information of the developed image thereof are focussed on the light receiving surface of the line sensor 54 by the scanner optical system 52. The line sensor 54 serves as a photoelectric-conversion device for sensing and converting the image information into electrical pixel signals. Of course, the light source 50 and the line sensor 54 are of suitable length to completely cover and extended over a width of a recording area of the electro-developing recording medium RM. The electrical pixel signals are read out from the line sensor 54 during a movement of the scanning mechanism 48 between the two adjacent scanning steps.

ON and OFF control of the light source 50 is performed by a light source drive circuit 56. The intermittent movement of the scanning mechanism 48 is carried out by driving the drive motor for the carriage member 55 under control of a scanner drive circuit 58. The reading-out of the pixel signals from the line sensor 54 is controlled by a line sensor drive circuit 60. These drive circuits 56, 58, and 60 are controlled by the system control circuit 28.

The pixel signals sensed by and read out from the line sensor 54 are amplified by an amplifier 62, and are then converted to digital pixel signals by an analog-to-digital (A/D) converter 64. The digital pixel signals are subjected to a shading correction, a gamma correction, and so on by an image processing circuit 66 under control of the system control circuit 28, and are then temporarily stored in a memory 68, which may include an EEPROM having correction data for the shading correction. Note, the memory 68 may have a capacity for storing a single-line of digital pixel signals outputted from the line sensor 54 or it may have a capacity for storing a single-frame of digital pixel signals obtained by a completion of the scanning operation of the scanning mechanism 48.

The pixel signals outputted from the memory 68 may be optionally inputted into an interface circuit 70 through the image processing circuit 66. In this case, the pixel signals are subjected to a given process, such as a format-conversion process and so on, and are then transferred from the interface circuit 70 to, for example, an external monitor device (not shown) through the output terminal connector 26.

Also, the pixel signals outputted from the image process circuit 66 may be recorded on, for example, a second recording medium, such as an IC memory card, a floppy disk, a detachable hard disk, or the like, in an image recording device 74 therefor. The pixel signals read out of the second recording medium may be transferred to an external processing device, such as a personal computer, if necessary. In this case, the pixel signals are subjected to a given process, such as an image-compression processing, a format-conversion processing in a recording device control circuit 72, and so on.

The interface circuit 70 and the recording device control circuit 72 are operated in accordance with command signals outputted from the system control circuit 28.

The release switch 16 and the scan start switch 20 are connected to the system control circuit 28, and the photographing operation and the scanning operation are executed in the manner as mentioned above by turning the switches ON, respectively. Also, the LCD panel 22 is connected to the system control circuit 28 through a liquid crystal drive circuit 76 to display various setting conditions of the electro-developing type camera, suitable massages, and so on. Further, the main switch 24 is connected to the system control circuit 28 to control ON and OFF settings of a main power source (not shown).

Figure 3:
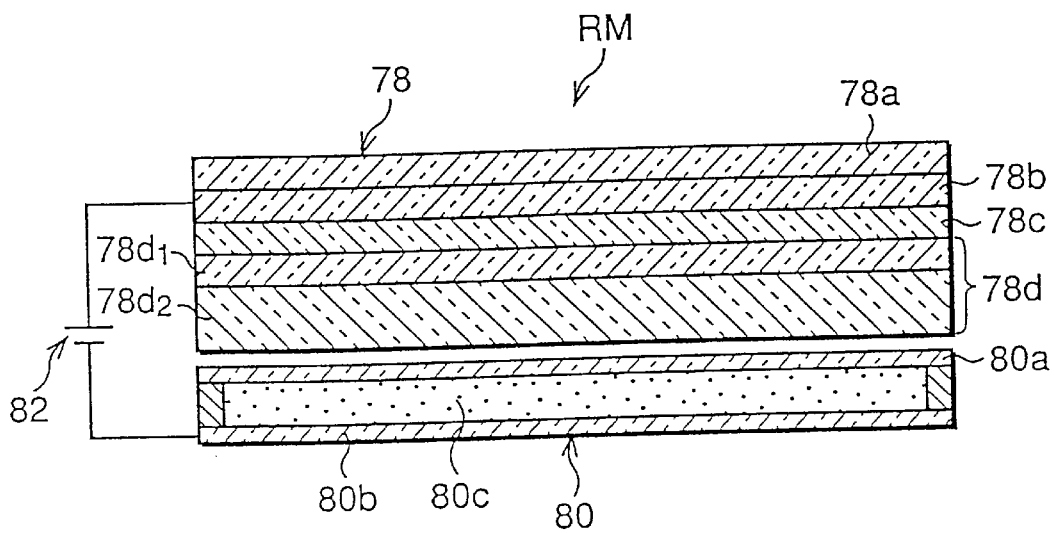
FIG. 3 is a cross sectional view showing a structure one type of electro-developing recording medium used in an electro-developing type camera.

FIG. 3 shows a structure of one type of the electro-developing recording medium RM which can be used in an electro-developing type camera. This type of recording-medium RM is identical with that disclosed in Japanese Unexamined Patent Publication No. 5-2280 and U.S. Pat. No. 5,424,156, the disclosed details of which are expressly incorporated herein by reference in their entirety. The electro-developing recording medium RM comprises an electrostatic information recording medium 78 and an electric charge keeping medium 80, and a voltage is applied therebetween by an electric power source 82, illustrated symbolically in FIG. 3.

The electrostatic information recording medium 78 is formed by laminating a base plate 78a, an electrode layer 78b, an inorganic oxide material layer 78c and a photoconducting layer 78d. The photoconducting layer 78d is formed by laminating an electric charge generating layer $78d_1$ and an electric charge transferring layer $78d_2$.

The electric charge keeping medium 80 comprises a liquid crystal display which includes a liquid crystal supporting plate 80a, a liquid crystal electrode layer 80b, and a liquid crystal 80c intervened therebetween. Namely, the liquid crystal 80c is confined as a film-like layer between the supporting plate 80a and the electrode layer 80b.

In the example of the electro-developing recording medium RM shown in FIG. 3, the electric charge transferring layer $78d_2$ of the photoconducting layer 78d and the liquid crystal supporting plate 80a of the electric charge keeping medium 80 face each other with a small gap therebetween. Note, as is apparent from FIG. 3, the whole structure of the electrostatic information recording medium 78 is transparent.

In photographing, the voltage signal is applied as recording medium activating signal from the electric power source 82 to the electro-developing recording medium RM, i.e., between the electrode layer 78b of the electrostatic information recording medium 78 and the liquid crystal electrode layer 80b of the electric charge keeping medium 80. When an optical image is formed on the electrostatic information recording medium 78 by the photographing optical system 12 during the application of the voltage from the electric power source 82 thereto, an electric charge distribution is produced over the electrostatic information recording medium 78 in accordance with a light intensity distribution of the optical image formed thereon, so that the intensity of an electric field, acting on the liquid crystal 80c of the electric charge keeping medium 80, is in accordance with the electric charge distribution.

Thus, the optical image obtained from the photographing optical system 12 is reproduced in the liquid crystal 80c as a visible image. Namely, as soon as the optical image is formed on the electrostatic information recording medium 78, the image is developed in the electric charge keeping medium 80.

As is already stated hereinbefore, when the liquid crystal 80c is of a memory-type, such as a smectic liquid crystal, the developed image can be kept in the electro-developing recording medium RM even if the electric field is eliminated therefrom.

Of course, before the developed image can be obtained with an optimum contrast, a contrast adjustment should be properly carried out. In the electro-developing recording medium RM as mentioned above, the contrast control relates closely to a time during which a voltage is applied to the electro-developing recording medium RM, as discussed below.

Figure 4:
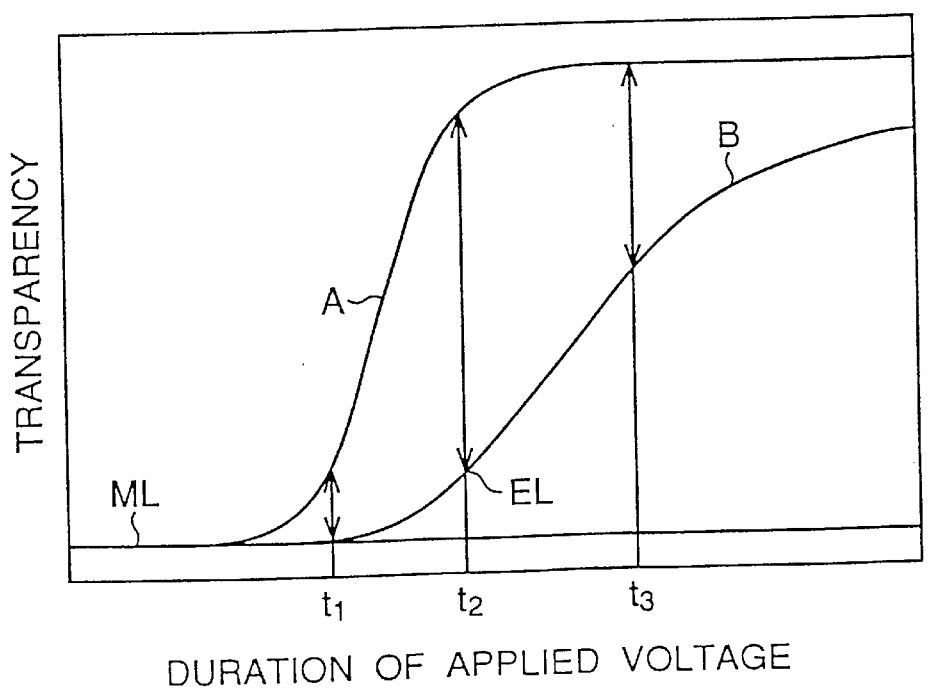
FIG. 4 is a graph showing characteristic curves of transparencies at light and dark zone images of an electric charge keeping medium of the electro-developing recording medium shown in FIG. 3, respectively.

For example, while a chart image having a white zone and a black zone is formed on the electrostatic information recording medium 78 of the electro-developing recording medium RM, and while the white and black zones of the chart image are developed as a light area of the image and a dark area of the image in the electric charge keeping medium or liquid crystal display 80 thereof, respectively, the transparencies of the light area of the image and the dark area of the image vary in accordance with a duration of the applied voltage to the electro-developing recording medium RM, as shown in a graph of FIG. 4.

Namely, in this graph, a characteristic curve A represents a change of the transparency of the light area of the chart image, and a characteristic curve B represents a change of the transparency of the dark area of the chart image. As is apparent from the graph, the characteristic curve A abruptly rises, whereas the characteristic curve B gradually rises, because an electrical resistance of a local portion of the electrostatic information recording medium 78 corresponding to the dark area of the chart image is not infinite so that an electrical current can flow in that local portion to thereby cause an gradual increase in transparency at the dark are of the chart image.

In short, an amount of electrical current flowing in the local portion of the electrostatic information recording medium 78 corresponding to the light area of the chart image is larger than that flowing in the other local portion of the electrostatic information recording medium 78 corresponding to the dark area of an image, so that the voltage applied to the light area of the chart image raises more rapidly in comparison with that to the dark area of that chart image. Thus, as shown in the graph of FIG. 4, the change of the transparency of the light area of an image (curve A) is more abrupt than that of the transparency of the dark area of an image (curve B).

A difference between the transparencies of the light and dark areas of the chart image represents a contrast of the image developed in the liquid crystal display 80 of the electro-developing recording medium RM. As is apparent from the graph of FIG. 4, the application of voltage to the electro-developing recording medium RM should be stopped at a time of $t_2$ so that the image can be developed with a maximum or optimum contrast. If the application of voltage to the electro-developing medium RM is prematurely stopped at a time of $t_1$, for example, a contrast of the developed image is very small compared to $t_2$. On the other hand, when the application of voltage to the electro-developing recording medium RM is stopped too late, as indicated by $t_3$, a contrast of the developed image is also smaller than at $t_2$.

Of course, a duration of the applied voltage from the recording medium drive circuit 46 to the electro-developing recording medium RM is controlled such that an optical image obtained from the photographing optical system 12 can be developed in the electro-developing recording medium RM with maximum or optimum contrast.

As is apparent from the foregoing, once the development of the image in the liquid crystal display 80 of the electro-developing recording medium RM is carried out, a trasnparency of a dark area of the developed image must rise from a minimum level to a given level, as in the case shown in the graph of FIG. 4 in which the characteristic curve B raises from the minimum level "ML" to a level "EL".

Namely, as is apparent from the characteristic curve B, once the voltage is applied to the electro-developing recording medium RM, a transparency of the dark area of the developed image not exposed is varied, and can be kept even after the application of the voltage to the recording medium RM is stopped.

Note, according to the present invention, this phenomenon is utilized to determine whether the electro-developing recording medium RM has been recorded on or not, as discussed hereinafter in detail.

Figure 5:
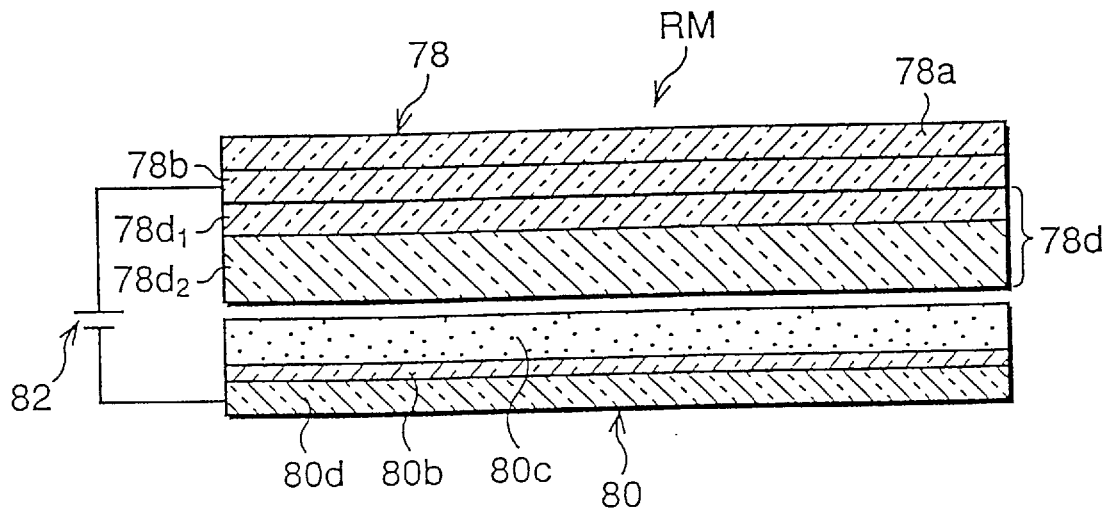
FIG. 5 is a cross sectional view showing a structure of another type of electro-developing recording medium used in an electro-developing type camera.

FIG. 5 shows a structure of another type of electro-developing recording medium RM which can be used in an electro-developing type camera. This type of recording medium RM is identical with that disclosed in Japanese Unexamined Patent Publication No. 5-165005, the disclosed details of which are expressly incorporated herein by reference in its entirety. In this drawing, the same references as used in FIG. 3 represent the same elements. The structure of the electrostatic information recording medium 78 is substantially identical with that shown in FIG. 3 except that the inorganic oxide layer 78c is omitted therefrom.

In FIG. 5, the electric charge keeping medium or liquid crystal display 80 is constituted as a liquid-crystal-polymer composite (LCPC) as disclosed in the above-mentioned publication. In particular, the liquid-crystal-polymer composite includes a polymer film having a plurality of spherical fine polymer elements dispersed over a surface thereof, and the polymer film is combined with the liquid crystal electrode 80b such that the spherical fine polymer elements are intervened therebetween, and such that a memory type of liquid crystal such as smectic liquid crystal is encapsulated in the space therebetween. Accordingly, once an optical image is developed in the electro-developing recording medium RM, the developed image can be kept in the electro-developing recording medium RM even if the electric field is eliminated therefrom.

Similar to the case of FIG. 3, once the voltage is applied to the electro-developing recording medium RM shown FIG. 5, a transparency of an dark area of a developed image thereof not exposed is varied as indicated by the characteristic curve B of FIG. 4, and is kept even after the application of the voltage to the recording medium RM is stopped.

Figure 6:
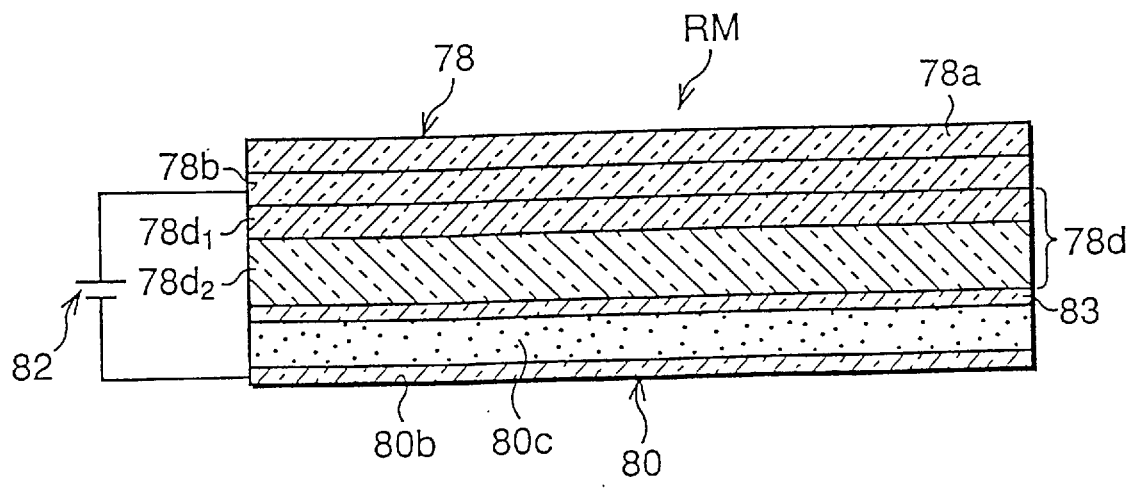
FIG. 6 is a cross sectional view showing a structure of yet another type of electro-developing recording medium used in an electro-developing type camera.

FIG. 6 shows a structure of yet another type of electro-developing recording medium RM which can be used in an electro-developing type camera. In this drawing, the same references as used in FIG. 3 represent the same elements. Similar to the case of FIG. 5, the structure of the electrostatic information recording medium 78 is substantially identical with that shown in FIG. 3 except that the inorganic oxide layer 78c is omitted therefrom. Further, similar to the case of FIG. 5, the electric charge keeping medium or liquid crystal display 80 is constituted as the liquid-crystal-polymer composite (LCPC).

In short, the electro-developing recording medium RM shown FIG. 6 is substantially the same as that of FIG. 5 except that the electrostatic information recording medium 78 and the electric charge keeping medium or liquid crystal display 80 are integrally combined with each other through the intermediary of an transparent insulating layer 89 without any gap therebetween.

Similar to the case of FIG. 3, once the voltage is applied to the electro-developing recording medium RM shown FIG. 6, a transparency of a dark area of a developed image thereof not exposed is varied as indicated by the characteristic curve B of FIG. 4, and is kept even after the application of the voltage to the recording medium RM is stopped.

Figure 7:
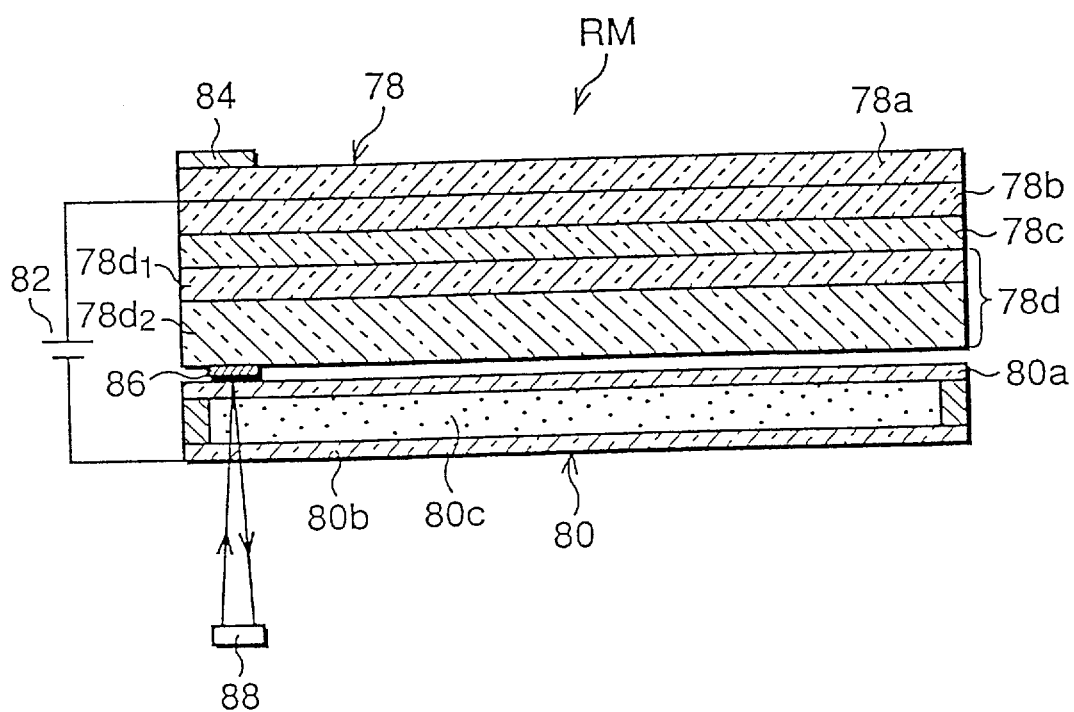
FIG. 7 is a cross sectional view showing a structure of the electro-developing recording medium used in the first embodiment of the electro-developing type camera according to the present invention.

FIG. 7 shows a structure of the electro-developing recording medium RM used in the electro-developing type camera according to the present invention, which is derived from that shown in FIG. 3. Note, in FIG. 7, the same references as shown in FIG. 3 represent the same elements. In short, the electro-developing recording medium RM shown in FIG. 7 is identical with that of FIG. 3 except that the former features a light-blocking element 84 and a light-reflecting element 86 associated with each other in order to determine whether the electro-developing recording medium RM has been recorded on or not.

In particular, as shown in FIG. 7, the light-blocking element 84 is adhered to a part of a margin area of the light receiving surface of the electrostatic information recording medium 78 such that the part is defined as a dark zone, and the light-reflecting element 86 is adhered to a surface of the photoconducting layer 78d so as to be aligned with the dark zone formed by the light-blocking element 84.

The light-blocking element 84 may comprise a piece of suitable metal foil such as aluminum foil, a suitable opaque coating, or the like. Also, the light-reflecting element 86 may comprise a piece of suitable metal foil such as aluminum foil, a suitable coating exhibiting reflectivity, or the like.

Note, in FIG. 7, the electric power source 82 forms a part of the recording medium drive circuit 46, and a recording medium activating signal (a voltage signal) is applied from the recording medium drive circuit 46 to the electro-developing recording medium RM during the photographic operation.

On the other hand, as shown in FIG. 2, the electro-developing type camera is provided with a transparency sensor 88 provided in the camera body 10 thereof in order to detect a transparency of a portion of the liquid crystal display 80 corresponding to the dark zone formed by the light-blocking element 84. As is apparent from FIG. 7, the transparency sensor 88 is arranged so as to be aligned with the light-reflecting element 86 when the electro-developing recording medium RM is loaded into the camera body 10.

The transparency sensor 88 includes a light emitting device, such as a light emitting diode (LED), and a light receiving device associated therewith, and is arranged such that a light beam emitted from the light emitting device is reflected by the light-reflecting element 88, and is then received by the light receiving device. Thus, an output signal obtained from the light receiving device of the transparency sensor 88 carries transparency information of the liquid crystal display 80 at the dark zone formed by the light-blocking element 84.

As shown in FIG. 2, the transparency sensor 88 is connected to the system control circuit 28 through a transparency sensor drive circuit 90 which is operated in accordance with a command signal outputted form the system control circuit 28. Also, the output signal outputted from the light receiving device of the transparency sensor 88 is fed to the system control circuit 28 through the transparency sensor drive circuit 90.

Figure 8:
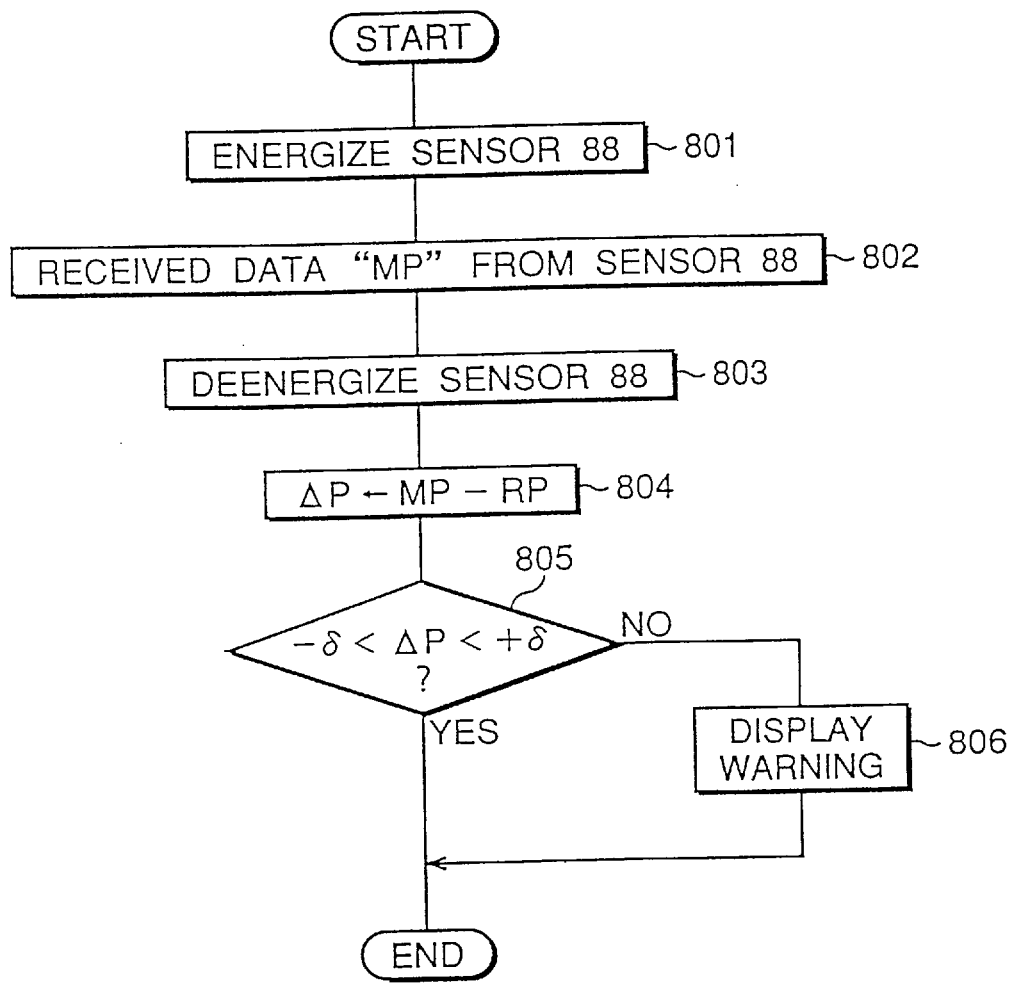

FIG. 8 shows a flowchart for explaining a routine for determining whether a loaded electro-developing recording medium has been recorded on. This routine is executed whenever the main switch 24 is turned ON. Also, while the main switch is turned ON, the routine is executed whenever an electro-developing recording medium loaded in the camera.

At step 801, the transparency sensor 88 is energized by the transparency sensor drive circuit 90. Accordingly, a light beam is emitted from the light emitting device of the transparency sensor 88, and is then transmitted through the liquid crystal display 80. The transmitted light beam is incident to the light-reflecting element 86, and is then reflected thereby. The reflected light beam is again transmitted through the liquid crystal display 80, and is then received by the light receiving device of the transparency sensor 88.

Thus, the light receiving device of the transparency sensor 88 produces an electrical signal carrying the transparency information of the liquid crystal display 80 corresponding to the dark zone formed by the light-blocking element 84.

At step 802, the produced electrical signal is received as transparency data "MP" by the system control circuit 28 through the transparency sensor drive circuit 90, and the received transparency data "MP" is temporarily stored in the RAM of the system control circuit 28. Then, at step 803, the transparency sensor 88 is deenergized.

At step 804, the following calculation is executed:

$$\Delta P \rightarrow MP - RP$$

Namely, a difference ΔP between the transparency data "MP" and reference data "RP" stored in the ROM of the system control circuit 28 and corresponding to the minimum level "ML" of the characteristic curve B shown in the graph of FIG. 4 is calculated.

At step 805, it is determined whether the difference ΔP falls in a permissible range defined by "−δ" and "+δ". If the electro-developing recording medium concerned has not been recorded on, the difference ΔP must be approximately equal to "0"., i.e., the difference ΔP must fall in the permissible range defined by "−δ" and "+δ". On the other hand, if the electro-developing recording medium concerned has been recorded on, the difference ΔP must be a given value corresponding to the level "EL" of the characteristic curve B shown in graph of FIG. 4.

Accordingly, when the difference ΔP is out of the permissible range defined by "−δ" and "+δ", the routine proceeds from step 805 to step 806, in which the LCD panel 22 displays a massage for warning that the electro-developing recording medium loaded in the camera has been recorded on.

As shown in FIG. 2, the electro-developing type camera may be optionally provided with an electronic buzzer 92 which may comprise a piezoelectric element. The electronic buzzer 92 is connected to the system control circuit 28 through a buzzer drive circuit 94. In this case, at step 806, the electronic buzzer 92 may be energized by the buzzer drive circuit 94 to warn that the electro-developing recording medium concerned has been recorded on.

Note, of course, the electric buzzer 92 may be only energized to warn that the electro-developing recording medium concerned has been recorded on without display the warning message on the liquid crystal display panel 22.

Figure 9:
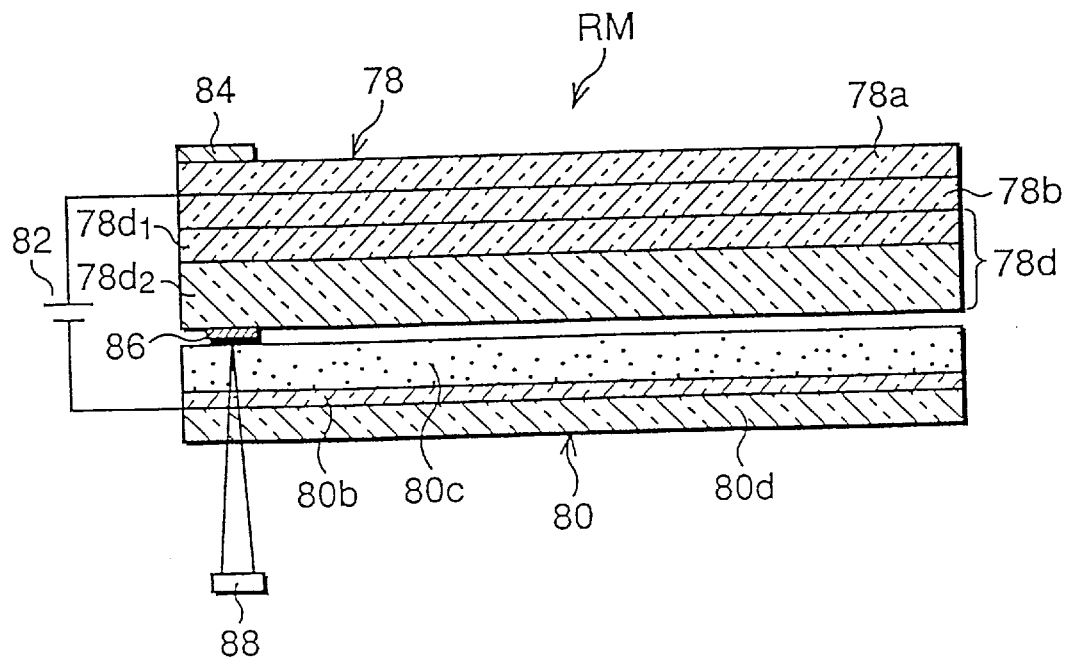
FIG. 9 is a cross sectional view showing a structure of another type of electro-developing recording medium used in the first embodiment of the electro-developing type camera.

FIG. 9 shows a structure of another type of electro-developing recording medium RM used in the electro-developing type camera according to the present invention, and this type of recording medium RM is derived from that shown in FIG. 5. Note, in FIG. 9, the same references as used in FIG. 3 represent the same elements. In short, the electro-developing recording medium RM shown in FIG. 9 is identical with that of FIG. 5 except that the former is provided with the light-blocking element 84 and the light-reflecting element 86 associated with each other.

Similar to the case shown in FIG. 7, the light-blocking element 84 is adhered to a part of a margin area of the light receiving surface of the electrostatic information recording medium 78 so as to form a dark zone thereat, and the light-reflecting element 86 is adhered to a surface of the photoconducting layer 78*d* so as to be aligned with the dark zone formed by the light-blocking element 84. Thus, it can be also determined whether the electro-developing recording medium RM of FIG. 9 has been recorded on or not, in the same manner as explained with reference to the flowchart of FIG. 8.

Figure 10:
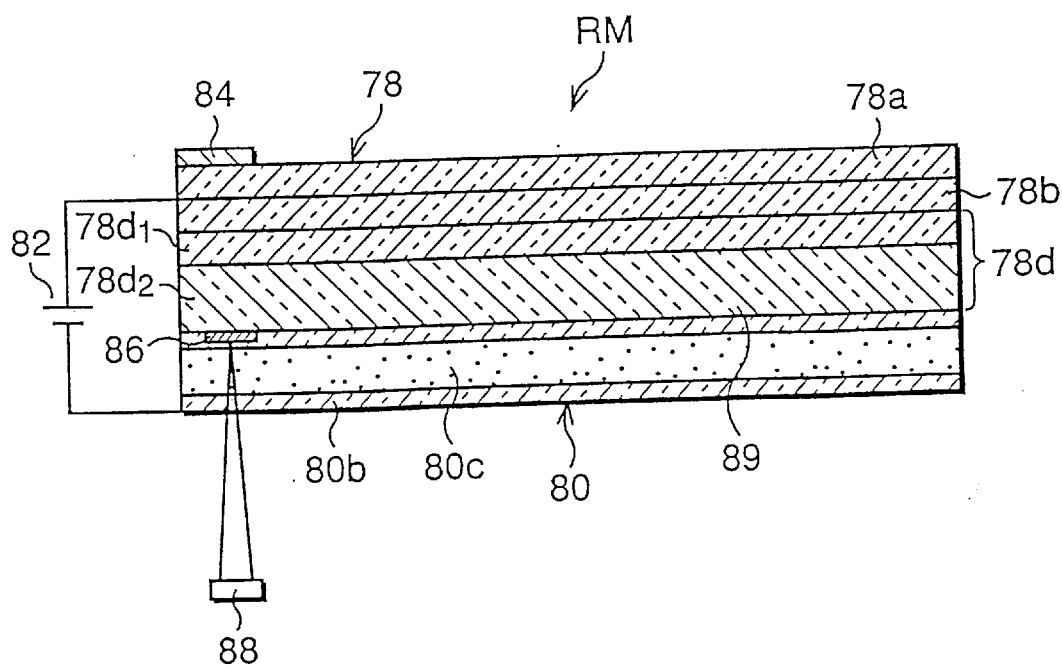
FIG. 10 is a cross sectional view showing a structure of yet another type of electro-developing recording medium used in the first embodiment of the electro-developing type camera.

FIG. 10 shows a structure of yet another type of electro-developing recording medium RM used in the electro-developing type camera according to the present invention, and this type of recording medium RM is derived from that of FIG. 6. Note, in FIG. 10, the same references as used in FIG. 3 represent the same elements. In short, the electro-developing recording medium RM is identical with that of FIG. 6 except that the former is provided with the light-blocking element 84 and the light-reflecting element 86 associated with each other.

Similar to the case shown in FIG. 7, the light-blocking element 84 is adhered to a part of a margin area of the light receiving surface of the electrostatic information recording medium 78 so as to form a dark zone thereat, and the light-reflecting element 86 is adhered to a surface of the photoconducting layer 78*d* so as to be aligned with the dark zone formed by the light-blocking element 84. Thus, it can be also determined whether the electro-developing recording medium RM of FIG. 10 has been recorded on or not, in the same manner as explained with reference to the flowchart of FIG. 8.

In the examples of the electro-developing recording medium RM shown in FIGS. 9 and 10, similar to the case of FIG. 7, the light-blocking element 84 may comprise a piece of suitable metal foil such as aluminum foil, a suitable opaque coating, or the like, and the light-reflecting element 86 may comprise a piece of suitable metal foil such as aluminum foil, a suitable coating exhibiting a reflectivity, or the like.

Also, in each of the three examples of the electro-developing recording medium RM shown in FIGS. 7, 9, and 10, although the light-reflecting element 86 is adhered to the photoconducting layer 78*d*, it may be optionally adhered to a surface of the liquid crystal supporting plate 80*a* of the electric charge keeping medium 80.

Figure 11:
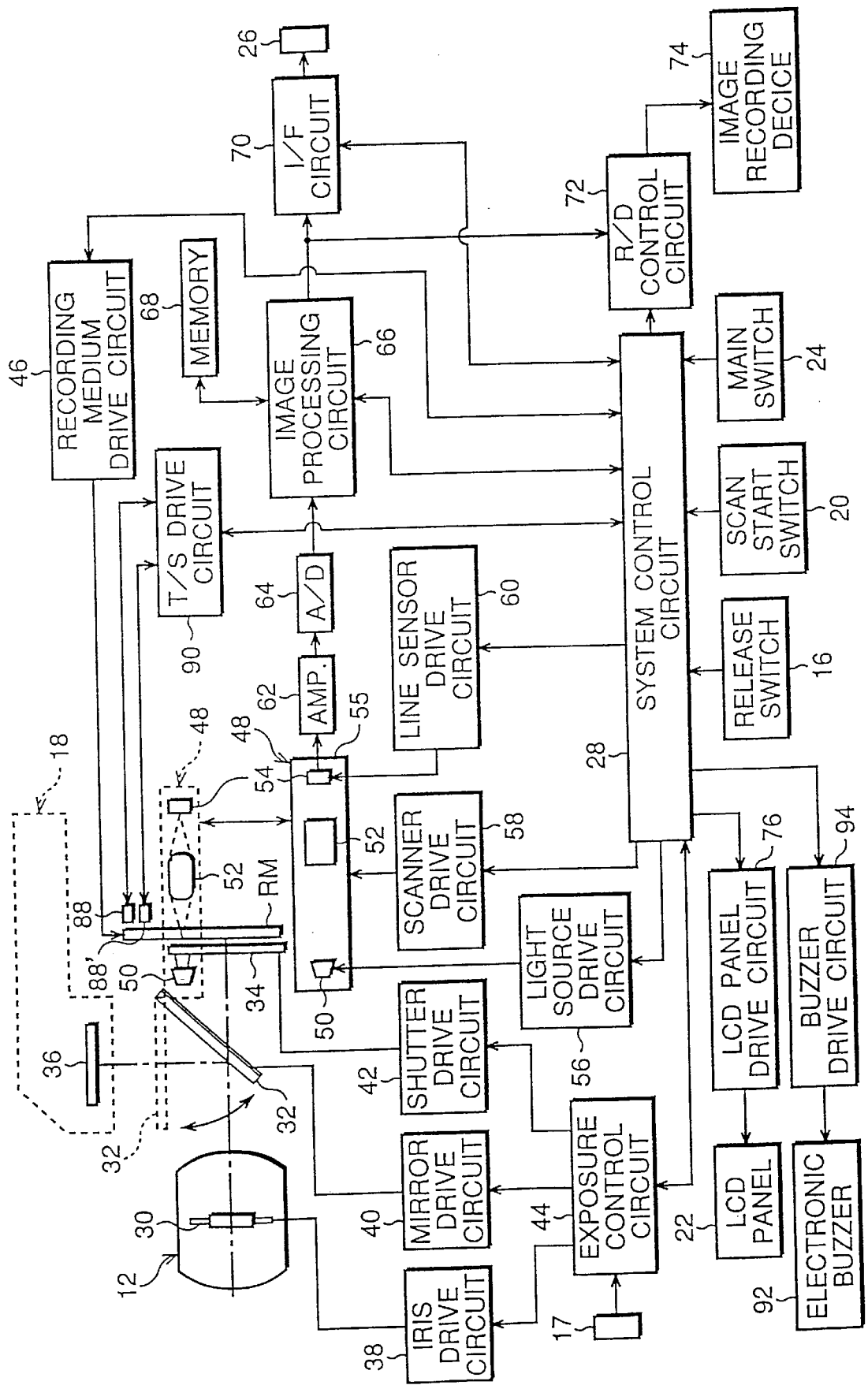
FIG. 11 is a block diagram of a second embodiment of the electro-developing type camera according to the present invention.

FIG. 11 shows a block diagram of a second embodiment of the electro-developing type camera according to the present invention. In this drawing, the same features used as in FIG. 2 are indicated by the same references.

As is apparent from FIG. 11, according to the second embodiment of the present invention, the electro-developing type camera is provided with an additional transparence sensor 88' incorporated in the camera body 10, and the additional transparency 88' is connected to the system control circuit 28 through the transparency sensor drive circuit 90. An arrangement of the additional transparency sensor 88' is identical with that of the transparency sensor 88, and thus the same descriptions referring to the transparency sensor 88 is true for the additional transparency sensor 88'.

Figure 12:
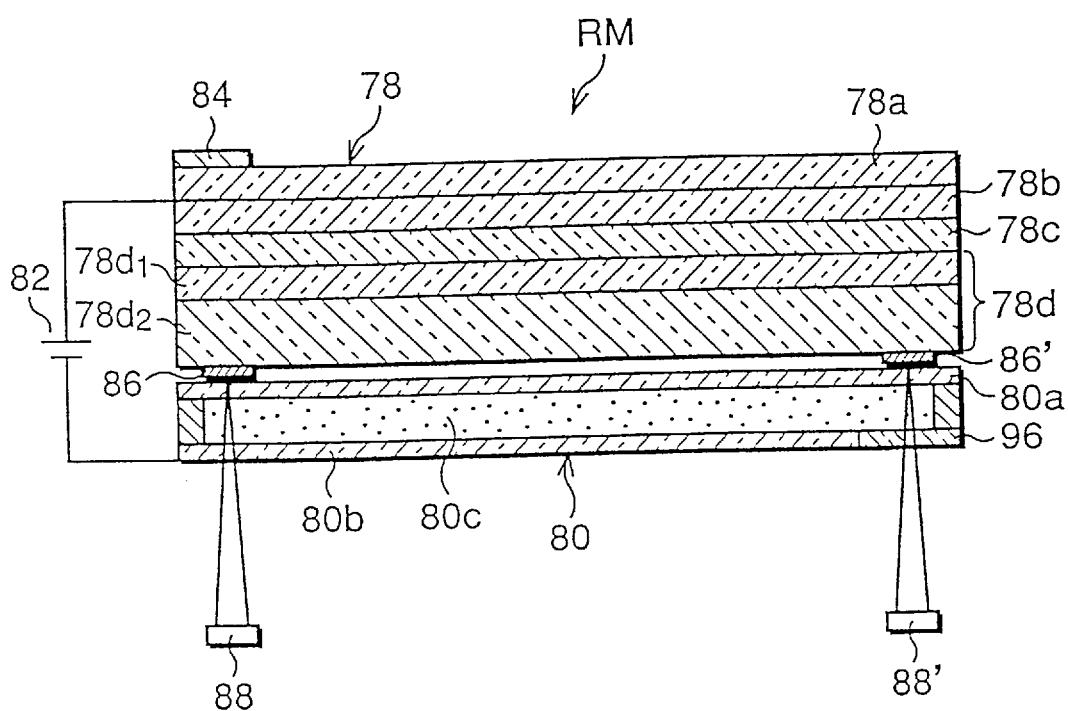
FIG. 12 is a cross sectional view showing a structure of the electro-developing recording medium used in the second embodiment of the electro-developing type camera according to the present invention.

FIG. 12 shows a structure of an electro-developing recording medium RM used in the second embodiment of the electro-developing type camera according to the present invention. This type of recording medium RM is derived from that of FIG. 3, and corresponds to that of FIG. 7, which is used in the first embodiment of the present invention. Note, in FIG. 12, the same references as used in FIG. 3 represent the same elements.

As is apparent from FIG. 12, this electro-developing recording medium RM is identical with that of FIG. 7 except that a part of a margin area of the liquid crystal electrode layer 80*b* of the former is replaced with a transparent insulator material 96 such as a transparent glass material. Accordingly, although the voltage is applied to the electro-developing recording medium RM, no electric field acts on a part of a margin area of the liquid crystal 80*c* defined by the transparent insulator material 96, and thus, that part of the margin area of the liquid crystal 80*c* always has a constant transparency, regardless of the application of voltage to the electro-developing recording medium RM.

Also, as shown in FIG. 12, a light-reflecting element 86' is adhered to the surface of the photoconducting layer 78*d* so as to be aligned with the transparent insulator material 96, and the additional transparency sensor 88' is arranged so as to be aligned with the light-reflecting element 86', when the electro-developing recording medium RM is loaded into the camera body 10. Accordingly, the additional transparency sensor 88' detects the constant transparency of the part of the margin area of the liquid crystal display 80c enclosed by the transparent insulator material 96.

When no voltage is applied to the electro-developing recording medium RM, a transparency of the liquid crystal display 80 thereof must have a minimum level as indicated by reference "ML" in the graph of FIG. 4. Nevertheless, the minimum level of transparency varies among the individual products of the electro-developing recording medium RM. According to the second embodiment of the present invention, in each of the products of the electro-developing recording medium RM, the minimum level of transparency can be detected by the additional transparency sensor 88'.

Figure 13:
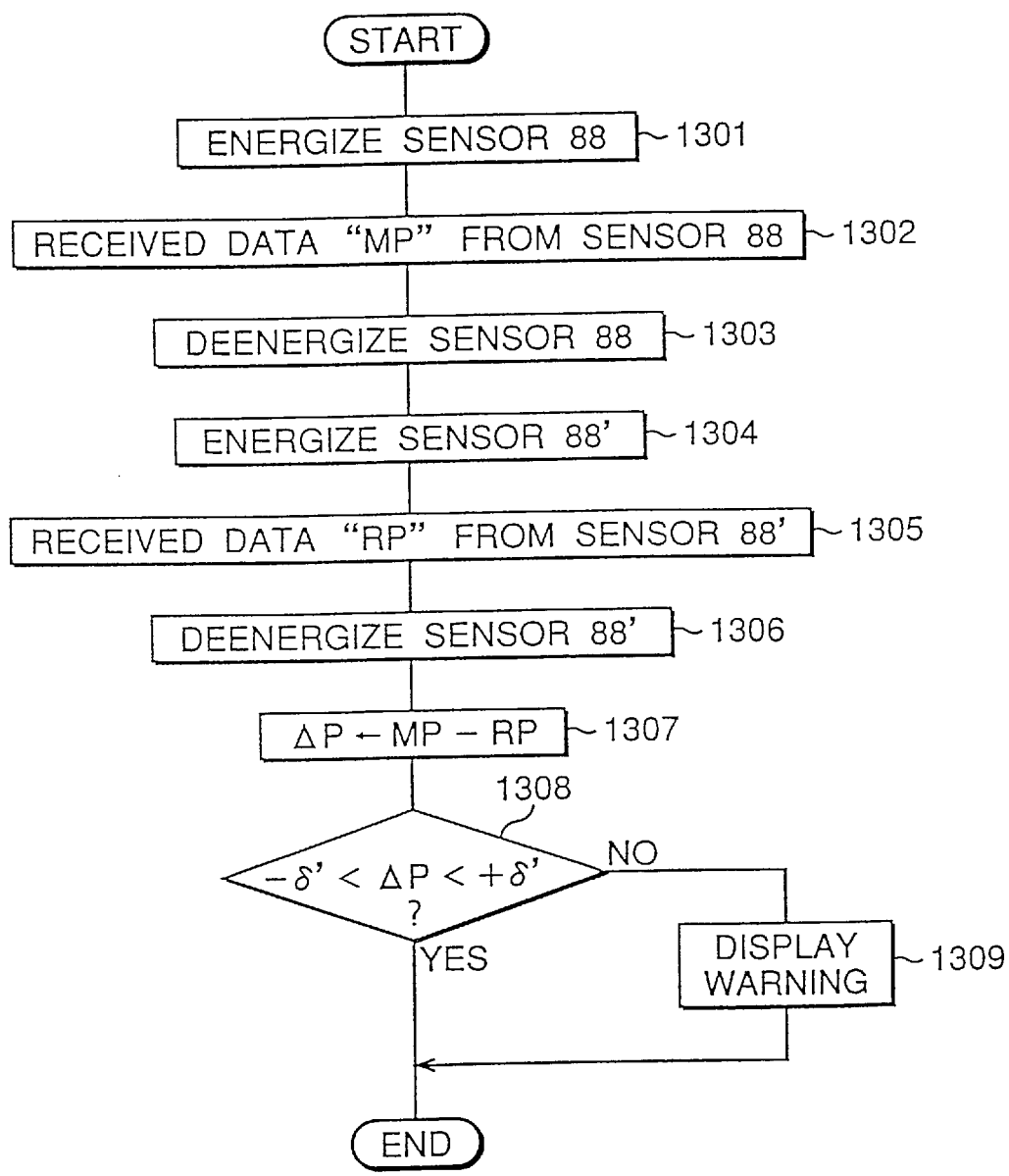

FIG. 13 shows a flowchart for explaining a routine for determining whether a loaded electro-developing recording medium has been recorded on or not in the second embodiment of the present invention. Similar to the routine of FIG. 8, this routine is executed by whenever the main switch 24 is turned ON. Also, while the main switch is turned ON, the routine is executed whenever an electro-developing recording medium is loaded into the camera.

At step 1301, the transparency sensor 88 is energized by the transparency sensor drive circuit 90. Accordingly, a light beam is emitted form the light emitting device of the transparency sensor 88, and is then transmitted through the liquid crystal display 80. The transmitted light beam is incident to the light-reflecting element 86, and is then reflected thereby. The reflected light beam is again transmitted through the liquid crystal display 80, and is then received by the light receiving device of the transparency sensor 88. Thus, the light receiving device of the transparency sensor 88 produces an electrical signal carrying the transparency information of the liquid crystal display 80 corresponding to the dark zone formed by the light-blocking element 84.

At step 1302, the produced electrical signal is received as a dark-zone-transparency data "MP" by the system control circuit 28 through the transparency sensor drive circuit 90, and the received dark-zone-transparency data "MP" is temporarily stored in the RAM of the system control circuit 28. Then, at step 1303, the transparency sensor 88 is deenergized.

At step 1304, the additional transparency sensor 88' is energized by the transparency sensor drive circuit 90. Accordingly, a light beam is emitted form the light emitting device of the additional transparency sensor 88', and is then transmitted through the liquid crystal display 80. The transmitted light beam is incident to the light-reflecting element 86', and is then reflected thereby. The reflected light beam is again transmitted through the liquid crystal display 80, and is then received by the light receiving device of the additional transparency sensor 88'. Thus, the light receiving device of the additional transparency sensor 88' produces an electrical signal carrying the transparency information of the liquid crystal display 80 corresponding to the non-electric field zone enclosed by the transparent insulator material 96.

At step 1305, the produced electrical signal is received as reference-transparency data "RP" by the system control circuit 28 through the transparency sensor drive circuit 90, and the received reference-transparency data "RP" is temporarily stored in the RAM of the system control circuit 28. Then, at step 1306, the additional transparency sensor 88' is deenergized.

At step 1307, the following calculation is executed:

$$\Delta P \rightarrow MP - RP$$

Namely, a difference $\Delta P$ between the dark-zone-transparency data "MP" and the reference-transparency data "RP" is calculated.

At step 1308, it is determined whether the difference $\Delta P$ falls in a permissible range defined by "$-\delta'$" and "$+\delta'$". If the electro-developing recording medium concerned has not been recorded on, the difference $\Delta P$ must be substantially equal to "0"., i.e., the difference $\Delta P$ must fall in the permissible range defined by "$-\delta'$" and "$+\delta'$". On the other hand, if the electro-developing recording medium concerned has been recorded on, the difference $\Delta P$ must be a given value corresponding to the level "EL" of the characteristic curve B shown in the graph of FIG. 4.

Accordingly, when the difference $\Delta P$ is out of the permissible range defined by "$-\delta'$" and "$+\delta'$", the routine proceeds from step 1308 to step 1309, in which the LCD panel 22 displays a message for warning that the electro-developing recording medium loaded in the camera has been recorded on.

As is apparent from the foregoing, according to the second embodiment of the present invention, in each of the products of the electro-developing recording medium RM, the reference-transparency data or minimum transparency data "RP", having the minimum level as indicated by reference RM in the graph FIG. 4, is detected by the additional transparency sensor 88' and is compared with the dark-zone-transparency data concerned. Accordingly, the permissible range defined by "$-\delta'$" and "$+\delta'$" can be made narrower than the permissible range defined by "$-\delta$" and "$+\delta$" in the first embodiment of the present invention. Namely, the determination obtained by the second embodiment of the present invention is more reliable than that obtained by the first embodiment thereof.

Similar to the first embodiment of the present invention, the electro-developing type camera may be optionally provided with the electronic buzzer 92 which may comprise a piezoelectric element, and the electronic buzzer 92 is connected to the system control circuit 28 through the buzzer drive circuit 94. In this case, at step 1309, the electronic buzzer 92 may be energized by the buzzer drive circuit 94 to warn that the electro-developing recording medium concerned has been recorded on.

Figure 14:
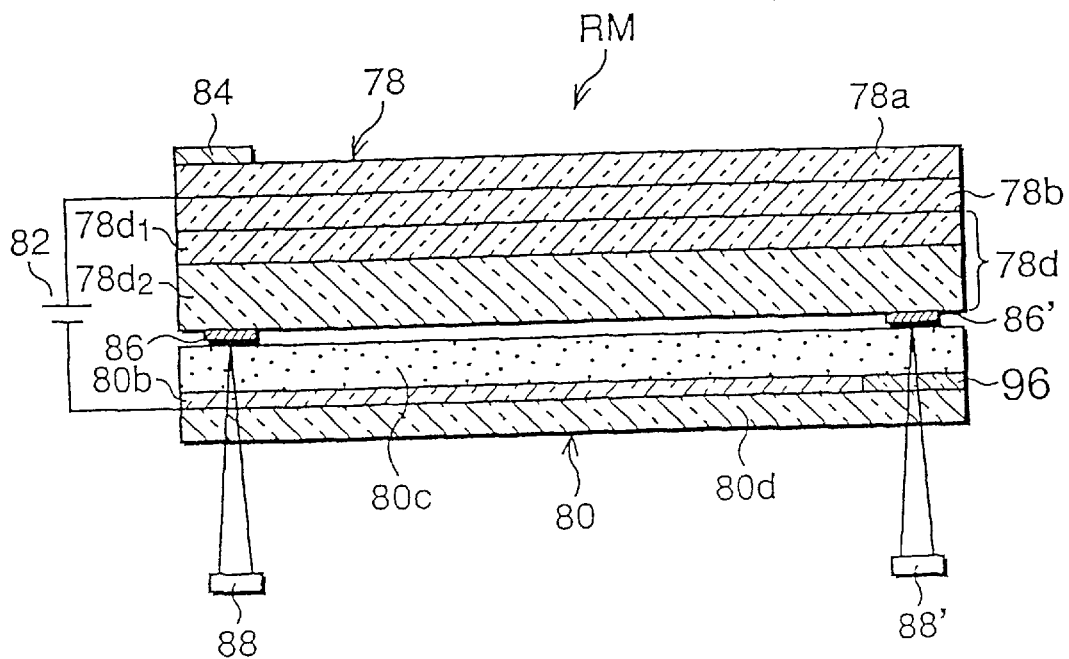
FIG. 14 is a cross sectional view showing a structure of another type of electro-developing recording medium used in the second embodiment of the electro-developing type camera.

FIG. 14 shows a structure of another type of electro-developing recording medium RM used in the second embodiment of the electro-developing type camera according to the present invention. This type of recording medium RM is derived from that of FIG. 5, and corresponds to that of FIG. 9, which is used in the first embodiment of the present invention. Note, in FIG. 12, the same reference as used in FIG. 3 represent the same elements.

As is apparent from FIG. 14, this electro-developing recording medium RM is identical with that of FIG. 9 except that a part of a margin area of the liquid crystal electrode layer 80b is replaced with the transparent insulator material 96 such as a transparent glass material, and the light-reflecting element 86' is adhered to the surface of the photoconducting layer 78d so as to be aligned with the transparent insulator material 96. The additional transparency sensor 88' is arranged so as to be aligned with the light-reflecting element 86', when the electro-developing recording medium RM is loaded into the camera body 10. Thus, it can be also determined whether the electro-developing recording medium RM of FIG. 14 has been recorded on or not in the same manner as explained with reference to the flowchart of FIG. 13.

Figure 15:
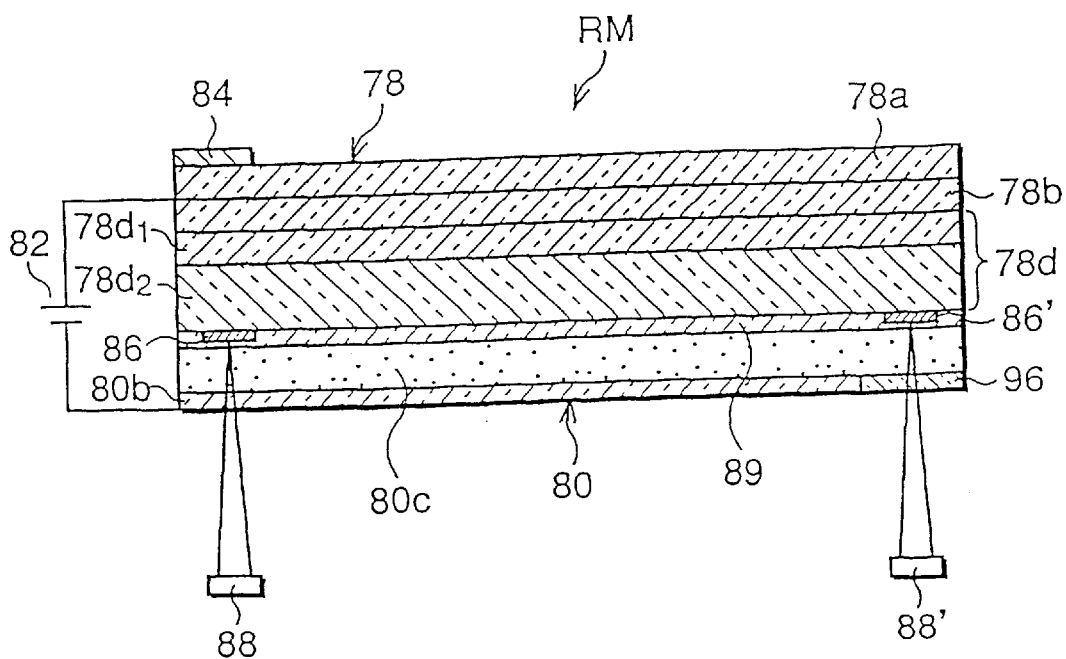
FIG. 15 is a cross sectional view showing a structure of yet another type of electro-developing recording medium used in the second embodiment of the electro-developing type camera.

FIG. 15 shows a structure of yet another type of electro-developing recording medium used in the second embodiment of the electro-developing type camera according to the present invention. This type of recording medium RM is derived from that of FIG. 6, and corresponds to that of FIG. 10, which is used in the first embodiment of the present invention. Note, in FIG. 15, the same references as used in FIG. 3 represent the same elements.

As is apparent from FIG. 15, this electro-developing recording medium RM is identical with that of FIG. 10 except that a part of a margin area of the liquid crystal electrode layer 80b is replaced with the transparent insulator material 96 such as a transparent glass material, and the light-reflecting element 86' is adhered to the surface of the photoconducting layer 78d so as to be aligned with the transparent insulator material 96. The additional transparency sensor 88' is arranged so as to be aligned with the light-reflecting element 86', when the electro-developing recording medium RM is loaded into the camera body 10. Thus, it can also be determined whether the electro-developing recording medium RM of FIG. 15 has been recorded on in the same manner as explained with reference to the flowchart of FIG. 13.

Finally, it will be understood by those skilled in the art that the foregoing description is of preferred embodiments of the disclosed electro-developing type camera, and that various changes and modifications may be made to the present invention without departing from the spirit and scope thereof.

The present disclosure related to subject matter contained in Japanese Patent Applications No. 7-289319 (filed on Oct. 11, 1995) and No. 8-134244 (filed on May 1, 1996), which are expressly incorporated herein, by reference, in their entirety.

We claim:

1. An electro-developing type camera using an electro-developing recording medium including an electrostatic information recording medium and an electric charge keeping medium, said camera comprising:
   a transparency sensor that detects dark-zone-transparency data at a portion of said electric charge keeping medium corresponding to a dark zone defined on a light receiving surface of said electrostatic information recording medium;
   a determiner that determines whether said dark-zone-transparency data falls within a permissible range of reference-transparency data; and
   an announcement device that announces a determination result obtained by said determiner.

2. An electro-developing type camera as set forth in claim 1, wherein said determiner comprises a calculator that calculates comparison data between said dark-zone-transparency data and said reference-transparency data, and said determiner determines whether said comparison data falls within said permissible range.

3. An electro-developing type camera as set forth in claim 1, wherein said announcement device comprises a warning device warning that said electro-developing recording medium has been recorded on when said dark-zone-transparency data is not substantially equal to said reference transparency data.

4. An electro-developing type camera as set forth in claim 3, wherein said warning device comprises a visible warning-display panel that displays a warning message indicating that said electro-developing recording medium has been recorded on when said dark-zone-transparency data is not substantially equal to said reference-transparency data.

5. An electro-developing type camera as set forth in claim 3, wherein said warning device comprises an acoustic warning device that provides a warning sound indicating that said electro-developing recording medium has been recorded on when said dark-zone-transparency data is not substantially equal to said reference-transparency data.

6. An electro-developing type camera using an electro-developing recording medium including an electrostatic information recording medium and an electric charge keeping medium, said camera comprising:
   a system control circuit including a memory that stores a program controlling an operation of the camera;
   said program including a sub-program that determines whether said dark-zone-transparency data falls within a permissible range of reference-transparency data; and
   an announcement device that announces a determination result obtained by said sub-program.

7. An electro-developing type camera as set forth in claim 6, wherein said sub-program comprises a calculation program that calculates comparison data between said dark-zone-transparency data and said reference-transparency data, and said sub-program determines whether said comparison data falls within said permissible range.

8. An electro-developing type camera is set forth in claim 1, wherein said announcement device comprises a warning device warning that said electro-developing recording medium has been recorded on when said dark-zone-transparency data is not substantially equal to said reference transparency data.

9. An electro-developing type camera as set forth in claim 8, wherein said warning device comprises a visible warning-display panel that displays a warning message indicating that said electro-developing recording medium has been recorded on when said dark-zone-transparency data is not substantially equal to said reference-transparency data.

10. An electro-developing type camera as set forth in claim 8, wherein said warning device comprises an acoustic warning device that produces a warning sound indicating that said electro-developing recording medium has been recorded on when said dark-zone-transparency data is not substantially equal to said reference-transparency data.

11. An electro-developing type camera using an electro-developing recording medium including an electrostatic information recording medium and an electric charge-keeping medium, said camera comprising:
   a first transparency sensor device that detects dark-zone-transparency data at a portion of said electric charge keeping medium corresponding to a dark zone defined on a light receiving surface of said electrostatic information recording medium;
   a second transparency sensor device that detects a base transparency data at a non-electric field portion of said electric charge keeping medium;
   a determiner that determines whether said dark-zone-transparency data falls within a permissible range of said base transparency data obtained by said second transparency sensor device; and
   an announcement device that announces a determination result obtained by said determiner.

12. An electro-developing type camera as set forth in claim 11, wherein said determiner comprises a calculation device that calculates comparison data between said dark-zone-transparency data and said reference-transparency data, and said determiner determines whether said comparison data falls within a given permissible range.

13. An electro-developing type camera as set forth in claim 11, wherein said announcement device comprises a warning device warning that said electro-developing recording medium has been recorded on when said dark-zone-transparency data is not substantially equal to said reference transparency data.

14. An electro-developing type camera as set forth in claim 13, wherein said warning device comprises a visible warning-display panel that displays a warning message indicating that said electro-developing recording medium has been recorded on when said dark-zone-transparency data is not substantially equal to said reference-transparency data.

15. An electro-developing type camera as set forth in claim 13, wherein said warning device comprises an acoustic warning device that produces a warning sound indicating that said electro-developing recording medium has been recorded on when said dark-zone-transparency data is not substantially equal to said reference-transparency data.

16. An electro-developing type camera using an electro-developing recording medium including an electrostatic information recording medium and an electric charge keeping medium, said camera comprising:

a system control circuit including a memory that stores a program controlling an operation of the camera;

a first transparency sensor device that detects dark-zone-transparency data at a portion of said electric charge keeping medium corresponding to a dark zone defined on a light receiving surface of said electrostatic information recording medium;

a second transparency sensor device that detects base transparency data at a non-electric field portion of said electric charge keeping medium;

said program including a sub-program that determines whether said dark-zone-transparency data falls within a permissible range of said base transparency data obtained by said second transparency sensor device; and an announcement device that announces a determination result obtained by said sub-program.

17. An electro-developing type camera as set forth in claim 16, wherein said sub-program comprises a calculation program that calculates comparison data between said dark-zone-transparency data and said reference-transparency data, and said sub-program determines whether said comparison data falls within said permissible range.

18. An electro-developing type camera as set forth in claim 1, wherein said announcement device comprises a warning device warning that said electro-developing recording medium has been recorded on when said dark-zone-transparency data is not substantially equal to said reference transparency data.

19. An electro-developing type camera as set forth in claim 18, wherein said warning device comprises a visible warning-display panel that displays a warning message indicating that said electro-developing recording medium has been recorded on when said dark-zone-transparency data is not substantially equal to said reference-transparency data.

20. An electro-developing type camera as set forth in claim 18, wherein said warning device comprises an acoustic warning device that produces a warning sound indicating that said electro-developing recording medium has been recorded on when said dark-zone-transparency data is not substantially equal to said reference-transparency data.

21. An electro-developing type camera according to claim 1, said transparency sensor detects dark zone transparency data of a recording medium in which transparency of a dark area of an unexposed developed image is varied in accordance with a characteristic curve upon application of voltage, and is maintained upon cessation of voltage application.

22. The electro-developing type camera according to claim 1, said transparency sensor detecting transparency of an area corresponding to a dark zone formed by a light blocking element.

* * * * *